Figure 1:
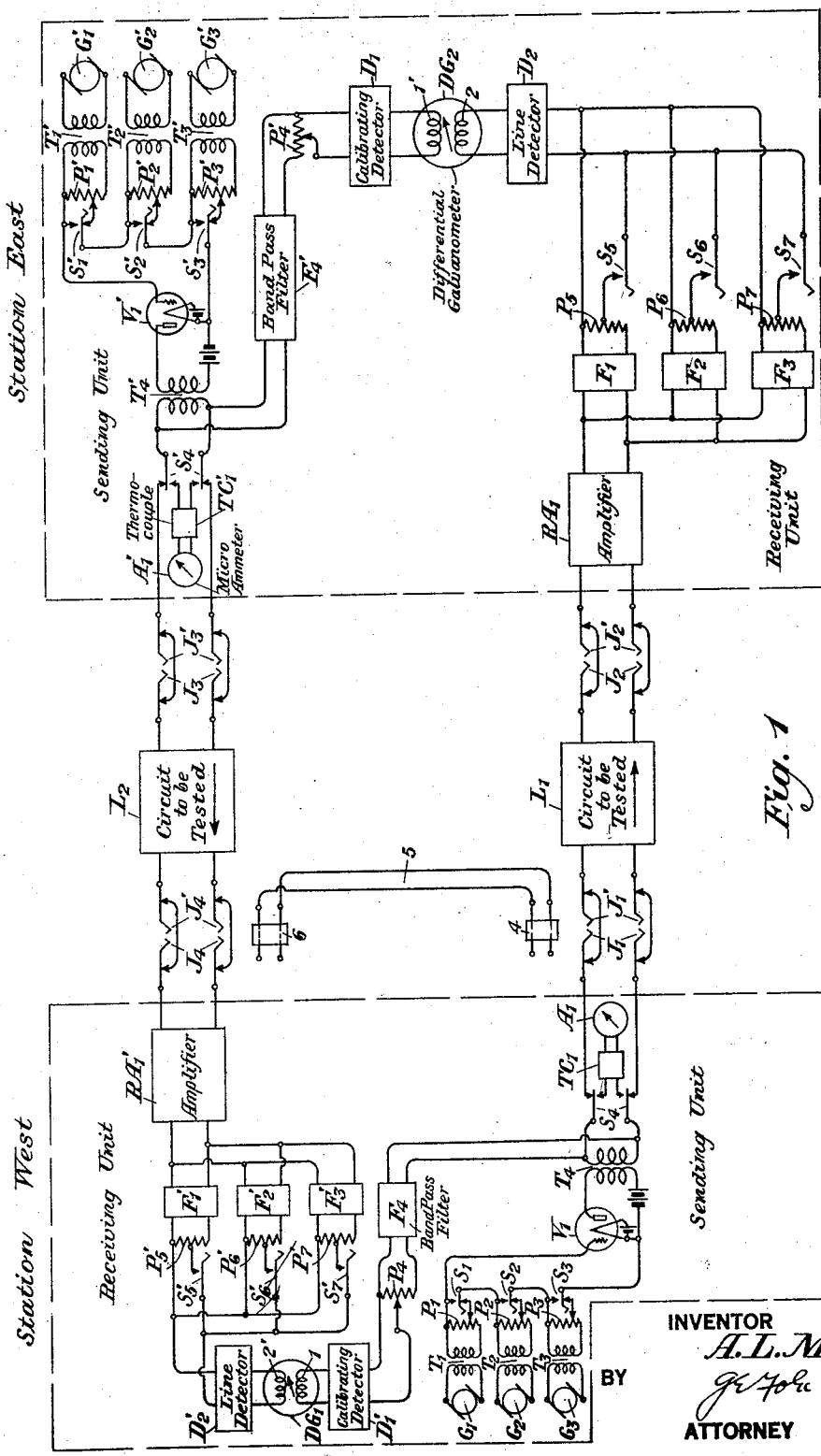

June 13, 1933. A. L. MATTE 1,913,495
MULTIFREQUENCY TRANSMISSION MEASURING SYSTEM
Filed Dec. 18, 1930  3 Sheets-Sheet 2

INVENTOR
A. L. Matte
BY
ATTORNEY

June 13, 1933.  A. L. MATTE  1,913,495
MULTIFREQUENCY TRANSMISSION MEASURING SYSTEM
Filed Dec. 18, 1930  3 Sheets-Sheet 3
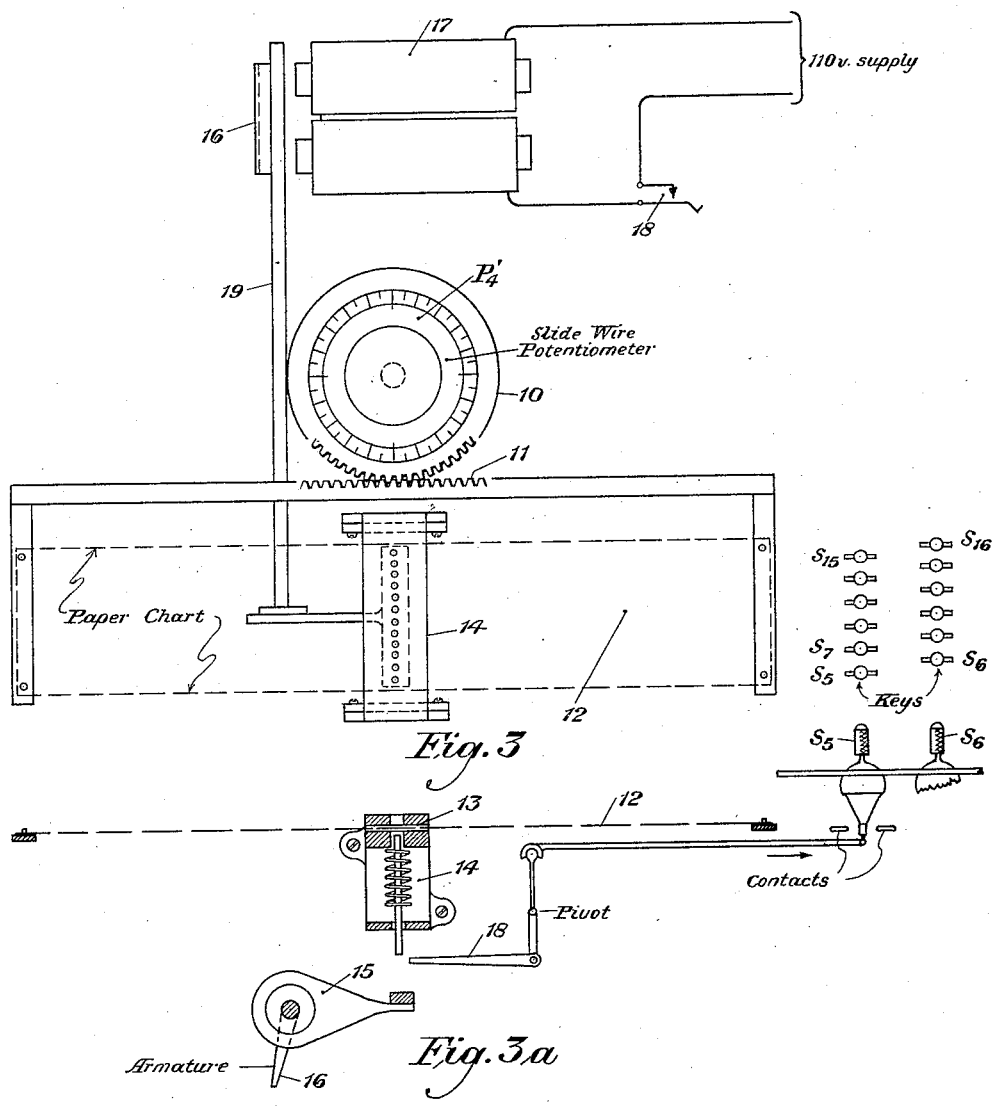
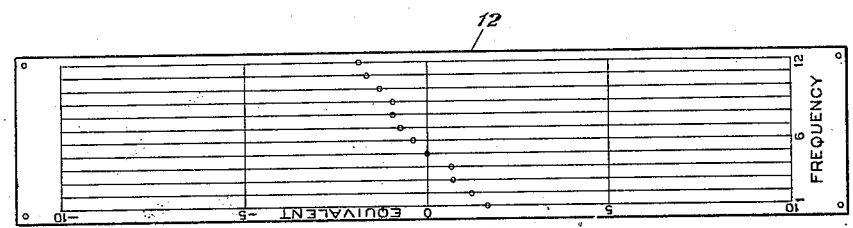
INVENTOR
A.L. Matte
BY
ATTORNEY Patented June 13, 1933

1,913,495

UNITED STATES PATENT OFFICE

ANDREW L. MATTE, OF SUMMIT, NEW JERSEY, ASSIGNOR TO AMERICAN TELEPHONE AND TELEGRAPH COMPANY, A CORPORATION OF NEW YORK

MULTIFREQUENCY TRANSMISSION MEASURING SYSTEM

Application filed December 18, 1930. Serial No. 503,341.

This invention relates to a system for determining the transmission efficiency of a circuit, and particularly to a system in which the transmission efficiency is measured at each of a plurality of frequencies, which frequencies are transmitted simultaneously over the said circuit.

In a linear circuit such as an attenuator composed of resistances only, electrically remote from inductive or other disturbing currents, the transmission measurements made at a single frequency, which frequency is the only one present in the system, would be the same as the measurements made at a single frequency during the presence of other frequencies in the system. Such equality does not exist in the case of long transmission lines, particularly where relatively high energy levels are used, since crowding and modulation take place. Those phenomena give rise to parasitic frequencies, and in the absence of selective networks designed to exclude all but the testing frequency at the receiving station, the parasitic currents will be integrated by the receiving detectors and the new frequencies will be inseparable from the transmitted frequency. Due to such action the transmission equivalent of a circuit, over which a current of 1,000 cycles is transmitted while crowding exists, as measured by a standard transmission measuring set, will not actually represent the ratio of the 1,000-cycle current received to the 1,000-cycle current transmitted, but the ratio of the sum of all of the frequencies received to the 1,000-cycle current transmitted. The error created by the parasitic frequencies can be eliminated by using a filter that cuts off all frequencies above about 1,000 cycles.

When a number of frequencies are transmitted simultaneously through a non-linear network, such as a transmission line, there are in addition to the harmonics resulting from the crowding at each frequency, new combination frequencies, all of which exact their toll of energy from that of the impressed currents. If selective networks are used at the receiving end and care is taken that none of the impressed frequencies lead to modulation products that fall within the free transmitting bands of the receiving filters, the loss suffered by each transmitted frequency can be measured by itself and the effects of modulation in increasing line losses may be determined. Conversely, by selecting suitable transmitted frequencies the modulation products can be measured by such a device by having them fall within the free transmitting range of one of the receiving filters.

This invention resides, in part, in a method that consists essentially in causing a current to flow over the circuit whose transmission efficiency is to be measured, which current comprises a number of frequencies whose magnitudes are fixed, separating the current of each frequency at the receiving end by means of selective networks, then measuring the current of each frequency, and determining its ratio to the transmitted current.

Figure 2:
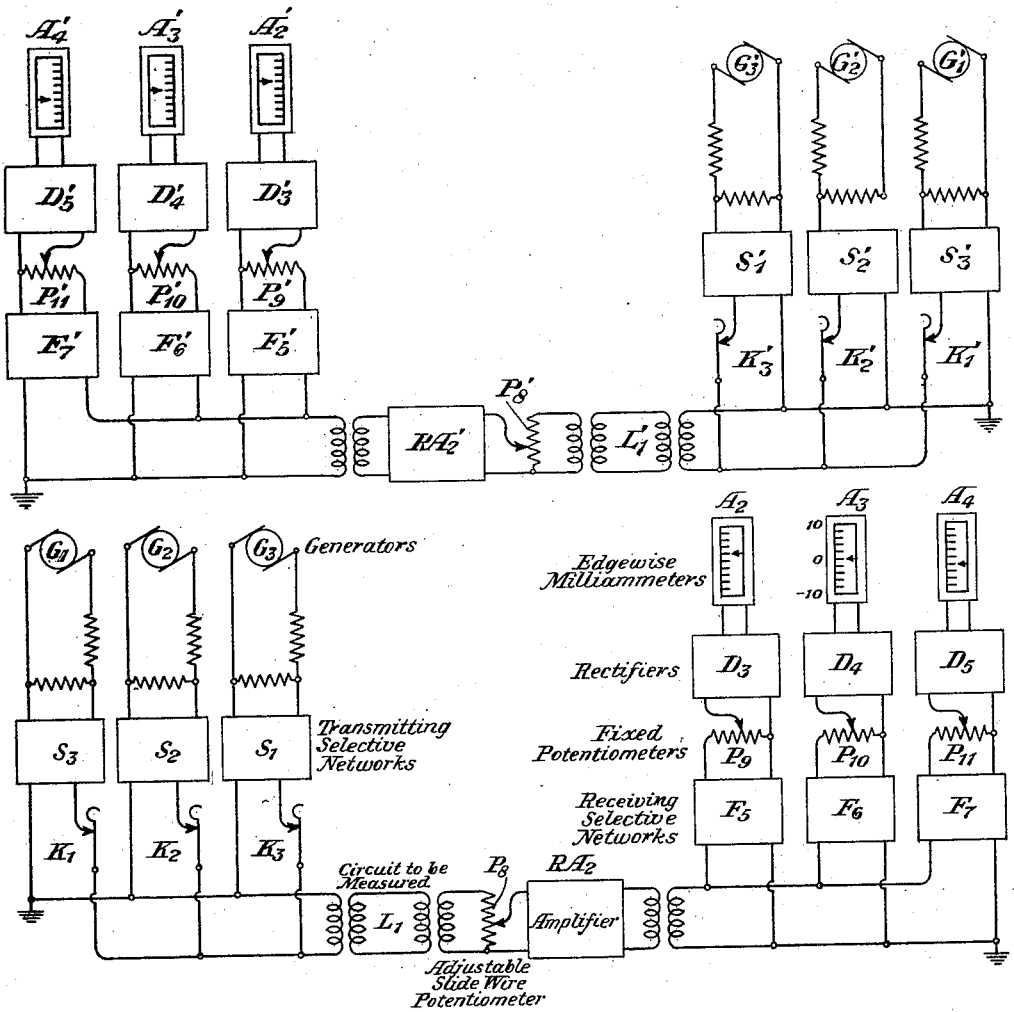

Other objects of this invention will be apparent from the following description when read in connection with the attached drawings, of which Figure 1 shows a form of embodiment of the invention in which visual indications of the transmission efficiency at each of the received frequencies are successively given; Fig. 2 shows an alternative form of indicator, designated a visualizer, that renders possible the observation of the indications of the transmission equivalent of the circuit at all of the frequencies simultaneously; Figs. 3 and 3a represent a plan and a cross-section of a modification of Fig. 1 to permit the making of a record on a printed form after the transmission equivalent has been visually observed at a measuring frequency; and Fig. 4 represents a form of chart to be used in connection with the arrangement shown in Fig. 3.

Fig. 1 represents the application of the invention to an arrangement in which the transmission equivalent is indicated by suitable apparatus at three frequencies, but it will be understood that a greater or smaller number of frequencies may be used. In Fig. 1, $G_1$, $G_2$ and $G_3$ represent sources of current of each of three frequencies that are intended to be transmitted simultaneously over the circuit to be tested. Each of the generators is connected to the primary winding of one of the transformers $T_1$, $T_2$ and $T_3$, across the secondary windings of which are connected the potentiometers $P_1$, $P_2$ and $P_3$, respectively. Those potentiometers are connected with the contacts of the switches $S_1$, $S_2$ and $S_3$, and with each other, so that one or more of the generators may be effectively connected with the grid circuit of the vacuum tube $V_1$ that acts as a voltage integrator. The output of the said tube is connected by the transformer $T_4$ with the movable arms of the switch $S_4$. Bridged across the circuit between transformer $T_4$ and switch $S_4$ is a calibrating circuit that includes a band pass filter $F_4$ that is intended to pass one of the frequencies lying within the range represented by the generators $G_1$, $G_2$ and $G_3$. The filter is connected with a potentiometer $P_4$ that controls the amplitude of the voltage applied to the calibrating detector $D_1'$, the output of which is connected with the winding 1 of the differential galvanometer $DG_1$. While this calibrating current is shown as derived from one of the measuring sources for convenience, it will be evident that it might be obtained from any other steady source suitable for causing the desired deflection of the galvanometer $DG_1$.

The outer contacts of the switch $S_4$ are connected through the jacks $J_1$—$J_1'$ and the associated cords to the circuit to be tested, designated as $L_1$. The inner contacts of the switch $S_4$ are connected to the thermocouple $TC_1$ which, in turn, is connected to the milliammeter $A_1$. The circuit $L_1$ is connected through the jacks $J_2$—$J_2'$ and their cords to the amplifier $RA_1$. The output circuit of that amplifier is branched and each branch contains one of the selective networks $F_1$, $F_2$ and $F_3$. Connected to the output of each of those networks is one of the potentiometers $P_5$, $P_6$ and $P_7$. The switches $S_5$, $S_6$ and $S_7$, which are associated with those potentiometers, are adapted to connect them with the input of the line detector $D_2$ (which has a high input impedance), the output of which is connected with winding 2 of the differential galvanometer $DG_2$.

The east station comprises also transmitting apparatus similar to that heretofore described in connection with the west station, which similar parts have been given the corresponding numbers primed. That transmitting apparatus is connected through the jacks $J_3$—$J_3'$ and the associated cords to the circuit $L_2$, which in turn is connected through the jacks $J_4$—$J_4'$ to receiving apparatus similar to that previously described in connection with the east station. The same numbers primed have been used to indicate the receiving apparatus at the west station corresponding to that at the east station.

Prior to the making of transmission measurements the apparatus must be calibrated. To do so it is necessary to adjust the magnitude of the transmitted currents at each test frequency. Accordingly the switch $S_4$ is operated so that the ammeter $A_1$ will be effectively connected with the output of the tube $V_1$. With key $S_1$ operated downwardly, and $S_2$ and $S_3$ in their upper positions, the output of generator $G_1$ only will be connected with the tube $V_1$. The potentiometer $P_1$ is then adjusted until the desired magnitude of current is indicated by $A_1$. Then $S_1$ is moved to its upper contact and $S_2$ to its lower contact, thereby connecting $G_2$ only to the input of $V_1$. The potentiometer $P_2$ is then adjusted until the desired current is indicated by $A_1$. In like manner, the adjustment of the potentiometer $P_3$ is made to give the desired current for $G_3$. After such adjustment has been made, all of the switches $S_1$, $S_2$ and $S_3$ are thrown to their lower positions, thereby connecting all of the generators in combination with the input of the tube $V_1$. The current of one of those frequencies will pass through the filter $F_4$, and will be rectified by the detector $D_1'$, and the resultant rectified current will flow through the winding 1 of the differential galvanometer. The potentiometer $P_4$ is then set at its mid position and the deflection of the needle of the galvanometer is noted, and called the zero position.

After that adjustment has been made the plug 4 of the cord 5 should be inserted in the jacks $J_1$ and the plug 6 in the jacks $J_4$. Then the switch $S_4$ is operated outwardly and the output of the tube $V_1$ will be transmitted over the cord 5 and impressed upon the amplifier $RA_1'$. The ouput of that amplifier will be impressed upon the branches containing the filters $F_1'$, $F_2'$ and $F_3'$, each of which is adapted to select one of the frequencies produced by the generators, and to impress it across one of the potentiometers $P_5'$, $P_6'$ and $P_7'$. Each potentiometer has a switch associated therewith by which the voltage at the selected frequency may be impressed upon the line detector $D_2'$ which has a high input impedance. It is desirable to point out that the impedance of the thermocouple $TC_1$ is the same as that of the line $L_1$, adapted to be connected with the switch $S_4$, and also the same as that of the amplifier $RA_1'$, so that the disconnection of the thermocouple and the connection of either the line $L_1$ or the amplifier $RA_1'$ does not alter the output impedance of the tube $V_1$. With the output of that tube connected by the cord 5 to the said amplifier, each of the frequencies is in turn selected by the manipulation of the switches $5_5'$, $5_6'$ and $5_7'$, and the voltage is impressed upon the detector $D_2'$. Considering for example, the frequency passed by the filter $F_1'$, the switch $S_5'$ is closed and the potentiometer $P_5'$ is adjusted until the current that flows through the winding $2'$ is sufficient to cause the needle of the differential galvanometer $DG_1$ to be restored to its zero position. In like manner, the potentiometers $P_6'$ and $P_7'$ are adjusted for the currents of their respective frequencies. Similar calibration must be made at the east station before it can be used for straightaway measurements.

With the potentiometers thus adjusted, the plugs 4 and 6 are withdrawn from their respective jacks, and the amplifier $RA_1'$ is connected to the line $L_2$ which in turn is connected to the source of current at the east station, viz the vacuum tube $V_1'$ and the generators $G_1'$, $G_2'$ and $G_3'$ associated therewith, which source has been calibrated in the manner described above. The system then is arranged to measure the transmission efficiency of the circuit $L_2$. To do this the switch $S_5'$ is closed, thereby selecting one of the frequencies transmitted from the east station over the line $L_2$ to the west station. The potentiometer $P_4$ is then varied and the transmission efficiency of the system above or below a zero loss will be indicated by the setting of the potentiometer $P_4$. In like manner, the transmission efficiency of the system at the frequencies represented by $F_2'$ and $F_3'$ may also be obtained.

The transmission efficiency of the four terminal networks $L_1$ may be measured simultaneously in a similar manner.

The terminals having been calibrated in the manner indicated above, any member of circuit may be measured without further adjustments of any element except $P_4$ and $P_4'$.

The arrangement shown in Fig. 1 permits the measurement of the transmission efficiency of a circuit at a single frequency during the transmission of a plurality of other frequencies over the same circuit. The arrangement shown in Fig. 2 differs from that in Fig. 1 in that it permits the simultaneous observation of the transmission equivalent of the circuit at all measuring frequencies.

At the west station of Fig. 2 there is shown an alternative arrangement in which a plurality of generators produce currents of equal, definite magnitudes, but of separate frequency as in Fig. 1, but differing from the latter in that each generator is connected to the circuit $L_1$ by a separate selective network. The line $L_1$ is connected at the east station to a receiving circuit that includes an adjustable potentiometer $P_8$ and a receiving amplifier $RA_2$. The output of the amplifier is connected to a plurality of branch circuits each including one of the selective networks $F_5$, $F_6$ and $F_7$, one of the potentiometers $P_9$, $P_{10}$ and $P_{11}$, one of the rectifiers $D_3$, $D_4$ and $D_5$ and one of the indicating devices $A_2$, $A_3$ and $A_4$, the latter being preferably edgewise milliammeters. The east station is also equipped with generators, selective networks, and other apparatus corresponding to those shown at the west station and designated by the same numbers primed, for transmission over the circuits to the west station; and in like manner, the west station is equipped with receiving apparatus similar to that shown at the east station, and indicated by the same numbers primed.

In order to calibrate the system, the generator equipment at the east station, for example, would be connected by a patching cord similar to 5 of Fig. 1 to the potentiometer $P_8$, i. e. the drop side of $L_1$ would be patched to the drop side of $L_2$, not bridged on; and the received energy would be adjusted by the potentiometer to any desired level. The amplifier $RA_2$ and the potentiometers $P_9$, $P_{10}$ and $P_{11}$; would be adjusted in succession so that the several ammeters would stand at their mid-scale i. e. zero positions. Then the local source of current would be disconnected from the potentiometer $P_8$ and the generators at the west station which have outputs of the same magnitude and frequency as that at the east station are connected with the line $L_1$ which, in turn, is connected across the potentiometer $P_8$. The frequencies transmitted will be severally selected by the networks $F_5$, $F_6$ and $F_7$, and the resultant rectified currents will flow through the said ammeters. The pointers of those instruments will take positions corresponding to the current magnitudes, and thus will effectively plot in space a transmission-frequency curve. If desired the potentiometer $P_8$ may be adjusted to bring back to zero the pointer on the milliammeter corresponding to some reference frequency, whereupon the meters will indicate the departure of the transmission losses from that reference frequency.

The arrangement, of which several views are shown in Figs. 3 and 3a, is intended for use in connection with the circuit of Fig. 1, and is designed to make a record of the transmission equivalent of the circuit after such equivalent has been indicated by the apparatus shown in the latter figure. The potentiometer $P_4$, shown in Fig. 1, which preferably is of the slide-wire type, has connected with its shaft, as shown in Fig. 3, a pinion 10 that meshes with a rack 11 that is connected with and forms a part of the framework for the support of a chart 12, upon which the record of the transmission measurement is made. As shown in Fig. 3a, the chart is capable of being moved longitudinally through a guide 13 of the punch block 14 that contains a plurality of pins for punching holes in the chart. The number of pins depends upon the number of test frequencies, there being one pin for each frequency. To prevent the operation of any pin other than that corresponding to the frequency under measurement at a particular time, the arrangement shown in Fig. 3a is provided. The hammer 15, which is rotated by the action of the armature 16 of the magnets 17 of Fig. 3 whenever the key 18 is closed, does not move sufficiently to make direct contact with the lower ends of the pins of the punch block. To effect the operation of the pins by the hammer, it is necessary to interpose between the hammer and the pin a device such as the finger 18, shown in Fig. 3a. As will be seen, the finger is controlled by the movement of the key $S_5$ whenever the latter is thrown in a counterclockwise direction. That will cause the end of the finger 18 to move to the left and thus insert itself between the hammer and the pin. It is to be understood, of course, that corresponding fingers and linking means are provided for each of the switches $S_6$, $S_7$, etc., that connect the potentiometers of the receiving circuit of Fig. 1 with the input of the line detector $D_2$.

The method of making a record by the mechanism just described is as follows: Let it be assumed that the frequency that passes through the filter $F_1$ is being measured, the switch $S_5$ would be operated, and the finger 18 will be moved so as to be beneath the lower end of the pin that, in Fig. 3, is horizontally opposite the switch designated $S_5$. After the potentiometer $P_4'$ has been adjusted to restore the needle of the differential galvanometer $DG_2$ to its zero position, the carriage that holds the chart 12 will occupy a certain position with respect to the line of the pins of the said punch block. As soon as the adjustment of the potentiometer brings the needle to its zero position, key 18 will be operated, which will energize its magnets and attract its armature 16. That action rotates the shaft 19 and causes the hammer 15 to strike the finger 18. The pin is forced upward, and the paper of the chart will be perforated. The opening of key 18 releases the armature 16 and allows the hammer to drop back. Key $S_5$ is then restored to its normal vertical position and key $S_6$ would be operated, thereby bringing a finger similar to 18 under the pin that is associated with the latter key.

The chart shown in Fig. 4 illustrates a measurement that is made at twelve different frequencies, but any number of frequencies may be employed, as desired. As shown on the drawings, the chart is in position to be inserted in the chart holder of Fig. 3.

It is, of course, to be understood that the arrangements shown in the figures and described hereinbefore are merely schematic embodiments of the invention for the purpose of illustrating in simple fashion the manner in which the invention may be employed. However, the invention is not limited to the forms shown but is capable of embodiment in other and different forms without departing from the spirit and scope of the appended claims.

What is claimed is:

1. In a system for determining the transmission efficiency of a circuit, the combination with a circuit, of a source of current of a plurality of frequencies connected with the said circuit for simultaneous transmission thereover, means connected with the said circuit to separately select each frequency, means to rectify the selected frequencies, and an electromagnetic device to differently compare the rectified current with another current of known value whereby the transmission efficiency of the circuit may be determined.

2. In a system for determining the transmission efficiency of a circuit, the combination with a circuit, of a source of current of a plurality of frequencies connected therewith, a receiving system comprising an amplifier, a plurality of branch circuits connected with the output of the said amplifier, each containing a network selective of a particular frequency, a potentiometer of comparatively low impedance, and a switch, a rectifier, whose impedance is relatively high compared with that of the potentiometer, adapted to be connected by each switch with each branch circuit, a differential galvanometer having one winding connected with said rectifier and the other winding connected with a source of current variable at will.

3. In a system for determining the transmission efficiency of a circuit, the combination with a transmission circuit of a source of current of a plurality of frequencies connected therewith, and a receiving circuit also connected with the same transmission circuit comprising means to select each of the frequencies impressed by the said source upon the said transmission circuit, a rectifier for the currents of the selected frequencies, another source of current of a plurality of frequencies, means to select one of the frequencies of said other source, a potentiometer upon which the last mentioned selected frequency is impressed, a rectifier of comparatively high impedance connected with the said potentiometer and an electromagnetic responsive device having differential windings, each of which is connected with one of the said rectifiers.

4. In a system for determining the transmission efficiency of a circuit, the combination with a transmission circuit of a source of current of a plurality of frequencies connected therewith, and a receiving circuit also connected with the same transmission circuit comprising means to select each of the frequencies impressed by the said source upon the same transmission circuit, a rectifier connected with all of said selecting means, the connection including a switch individual to and connected with each of said selecting means, another source of currents whose frequencies are the same as those of the said first source, a rectifier connected with the said other source of currents, the connection including a potentiometer, means also connected with the said other source to select at will one or more of the frequencies generated thereby, and an electromagnetic responsive device having differential windings, each of which is connected with one of the said rectifiers.

5. In a system for determining the transmission efficiency of a circuit, the combination with a plurality of sources of current of different frequencies, of means to set the current of each frequency at a desired value, a four terminal network upon which all of the said currents are impressed, a receiving circuit comprising means to select each of the frequencies transmitted over the said line, a differential galvanometer calibrated for known values of received current, means to connect each of the selecting means to the said galvanometer, and a potentiometer connected with the said galvanometer to indicate the transmission equivalent of the said line circuit at the measuring frequencies employed.

6. The method of determining the transmission efficiency of a circuit which consists in transmitting simultaneously over a circuit a current of a plurality of frequencies, and indicating the simultaneous magnitudes of the transmission efficiency of the system at any instant for every frequency employed.

7. The method of determining the transmission efficiency of a circuit which consists in transmitting simultaneously over a circuit a current of a plurality of frequencies, selecting each of the frequencies employed, separately rectifying the current of each selected frequency, and indicating the simultaneous magnitudes of the currents of all frequencies in terms of the transmission efficiency of the system at any instant.

8. The method of determining the transmission efficiency of a circuit, which consists in transmitting over the said circuit a current comprising a plurality of components, each of fixed magnitude and of a separate, discrete frequency, receiving the transmitted current and separating by frequency selection the components of said current, measuring simultaneously the magnitudes of the components of all frequencies and indicating the ratio of each component to the component of same frequency as transmitted.

9. In a system for determining the transmission efficiency of a circuit, the combination with a circuit over which is transmitted a multi-frequency current of a receiving circuit connected therewith including a variable potentiometer connected with said circuit, an amplifier having its input connected across said potentiometer, and a plurality of branch circuits connected across the output of said amplifier, each branch circuit containing a selective network, a rectifier and a visual indicating device connected with the output of said rectifier.

10. In a system for determining the magnitude of the components constituting the several frequencies of a multifrequency current, the combination with a source of multifrequency currents, of a plurality of branches connected thereto, each branch containing a frequency selective network, a rectifier, and an edgewise indicating milliammeter, the milliammeters of the several branches being arranged side by side.

11. In a system for recording the transmission efficiency as measured by the system of claim 3, the combination with a gear connected with the shaft of the slide wire potentiometer, of a carriage for supporting a paper chart, the said carriage having a rack coacting with the said gear, a guide through which the said chart is adapted to pass when mounted upon the said carriage, a plurality of pins mounted beneath said guide, a plurality of fingers, each adapted to be moved beneath one of said pins by the switch of a receiving branch circuit of claim 3, and means operable at will, to cause one of said pins to perforate the chart whenever the finger associated with that pin is in position beneath it.

12. In a system for recording the transmission efficiency of a circuit, the combination with a chart of a plurality of perforating devices, each individual to a particular frequency, means to adjust the position of said chart relative to the said perforating devices, and means, operable at will to cause each of said devices to perforate the said chart to record the transmission efficiency for each of said frequencies.

In testimony whereof, I have signed my name to this specification this 17th day of December, 1930.

ANDREW L. MATTE.